(12) United States Patent
Tsai et al.

(10) Patent No.: US 6,169,622 B1
(45) Date of Patent: Jan. 2, 2001

(54) OPTICAL SCANNER WITH A DISTANCE ADJUSTING DEVICE

(75) Inventors: Jern-Tsair Tsai, Taipei Hsien; Bill Chen, Ping-Tung, both of (TW)

(73) Assignee: Mustek Systems Inc., Hsin-Chu (TW)

( * ) Notice: Under 35 U.S.C. 154(b), the term of this patent shall be extended for 0 days.

(21) Appl. No.: 09/187,199

(22) Filed: Nov. 3, 1998

(51) Int. Cl.$^7$ .................................................. G02B 26/08
(52) U.S. Cl. .......................... 359/210; 359/823; 358/474; 358/483
(58) Field of Search .................... 359/210, 823; 358/474, 483; 355/53

(56) References Cited

U.S. PATENT DOCUMENTS 5,621,563 * 4/1997 Brook et al. ............................ 359/210
5,633,745 * 5/1997 Chen et al. ............................. 359/201

* cited by examiner

Primary Examiner—Cassandra Spyrou
Assistant Examiner—Euncha Cherry
(74) Attorney, Agent, or Firm—Winston Hsu

(57) ABSTRACT

The present invention provides a scanner with an object distance adjusting device that allows effective scanning of documents placed at varying heights over its transparent platform. The scanner comprises a movable scanning module with an optical sensing device for converting light into image signals, a lens set for focusing light onto the optical sensing device, and an object distance adjusting device for adjusting the object distance from the lens set to the document. The object adjusting device allows accurate object distances regardless of whether a transmitted document or a reflective document is scanned leading to exact resolution and high scanning quality.

4 Claims, 2 Drawing Sheets

OPTICAL SCANNER WITH A DISTANCE ADJUSTING DEVICE

BACKGROUND OF THE INVENTION

1. Field of the Invention

The present invention relates to an optical scanner, and more particularly, to an optical scanner with a distance adjusting device.

2. Description of the Prior Art

Flatbed scanners are commonly used for converting document data into image signals. The most critical component within a flatbed scanner is the optical scanning module. A scanning module usually comprises a casing with an opening for receiving light from the document, an optical sensing device installed within the casing for converting light from the document into corresponding image signals, and a lens installed in front of the optical sensing device for converging light from the document onto the optical sensing device.

The scanning module has a fixed resolution determined both by the image amplification of the optical scanning module and the resolving power of the optical sensing device. The image amplification of the scanning module is determined by its lens, the object distance between the document and the lens, and the image distance between the lens and the optical sensing device. If errors of the object and image distances are generated during the installation of the scanning module, the resolution of the scanning module will be affected.

In general, there are two types of scanners: transmitted type and reflective type. In a transmitted-type scanner, the document is defined as a transmitted document and the light source is positioned behind this document. Light travels from the light source to the document, then travels to the optical sensing device to be converted into image signals. Conversely, in a reflective-type scanner, the document is defined as a reflective document and the light source is positioned in front of this document. In this scheme, light is reflected by the document and then passed to the optical sensing device.

A flatbed scanner usually further comprises a document holder for fixing transmitted documents. To scan a transmitted document, the document holder is mounted on the transparent window of the flatbed scanner. The transmitted document is fixed onto the document holder. However, to scan a reflective document, the reflective document is placed directly onto the transparent window of the flatbed window. The document holder has a set thickness of approximately 2 mm to 5 mm and so the object distance of a transmitted document is 2 mm to 5 mm longer than that of a reflective document. This difference between the object distances in high resolution scanning modules often exceeds the tolerance of the lens of the scanning module. The image of a transmitted document thus cannot be accurately focused onto the optical sensing device.

SUMMARY OF THE INVENTION

It is therefore a primary objective of the present invention to provide an optical flatbed scanner with an object distance adjusting device to solve the above mentioned problem.

In a preferred embodiment, the present invention provides an optical scanner comprising a housing, a transparent platform installed on the housing for placing a reflective document; and a document holder with a transparent window for placing a transmitted document. The scanner further comprises a scanning module movably installed in the housing under the transparent platform for scanning a transmitted document or a reflective document. The scanning module comprises:

- a casing with a transparent window for receiving light from the document;
- an optical sensing device installed in the casing for converting the light from the document into corresponding image signals;
- three reflective mirrors installed in the casing for passing light from the document to the optical sensing device;
- a lens installed between the reflective mirrors and the optical sensing device for converging light from the document onto the optical sensing device;
- a plastic housing installed within the casing for mounting the lens and optical sensing device; and
- an adjusting device for adjusting the object distance between the document and the lens by moving the attached plastic housing.

The scanner further comprises a driving device for driving the scanning module, and a control device for controlling the scanning module and the driving device.

It is an advantage of the present invention that the object distance adjusting device can adjust the object distance between the document and the lens and the flatbed scanner is able to scan documents placed at different heights over the transparent platform of the scanner.

These and other objectives of the present invention will no doubt become obvious to those of ordinary skill in the art after reading the following detailed description of the preferred embodiment which is illustrated in the various figures and drawings.

DETAILED DESCRIPTION OF THE PREFERRED EMBODIMENT

Figure 1:
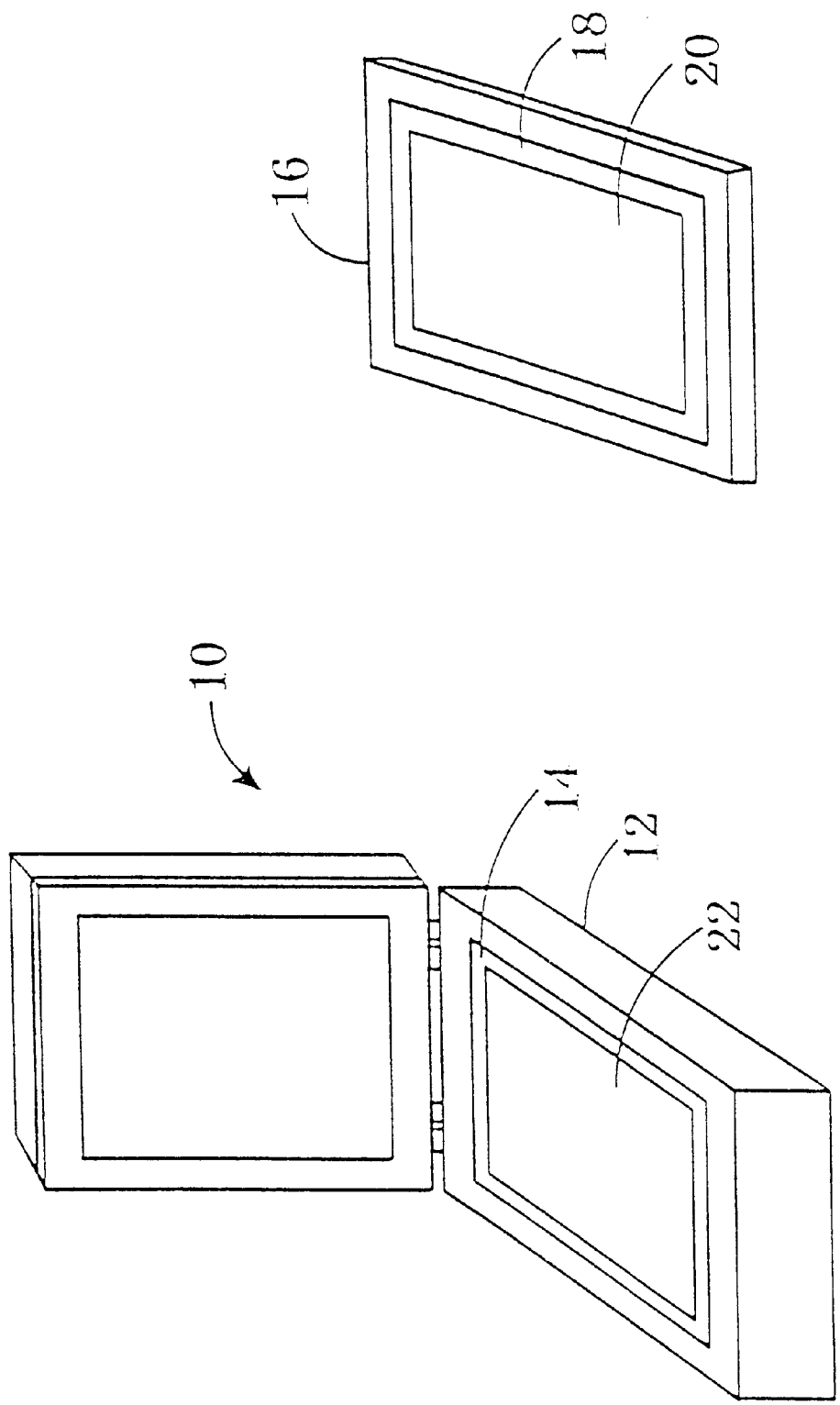
FIG. 1 is a perspective diagram of a scanner according to the present invention.

Please refer to FIG. 1. FIG. 1 is a perspective diagram of a scanner 10 according to the present invention. The scanner 10 comprises a housing 12, a transparent platform 14 installed on the housing 12 for placing a reflective document 22, and a document holder 16 having a transparent window 18 for placing a transmitted document 20.

To scan the transmitted document 20 using the scanner 10, the user mounts the document holder 16 on the transparent platform 14 then fixes the transmitted document 20 on the transparent window 18. To scan the reflective document 22, the reflective document 22 is placed directly onto the transparent platform 14.

Figure 2:
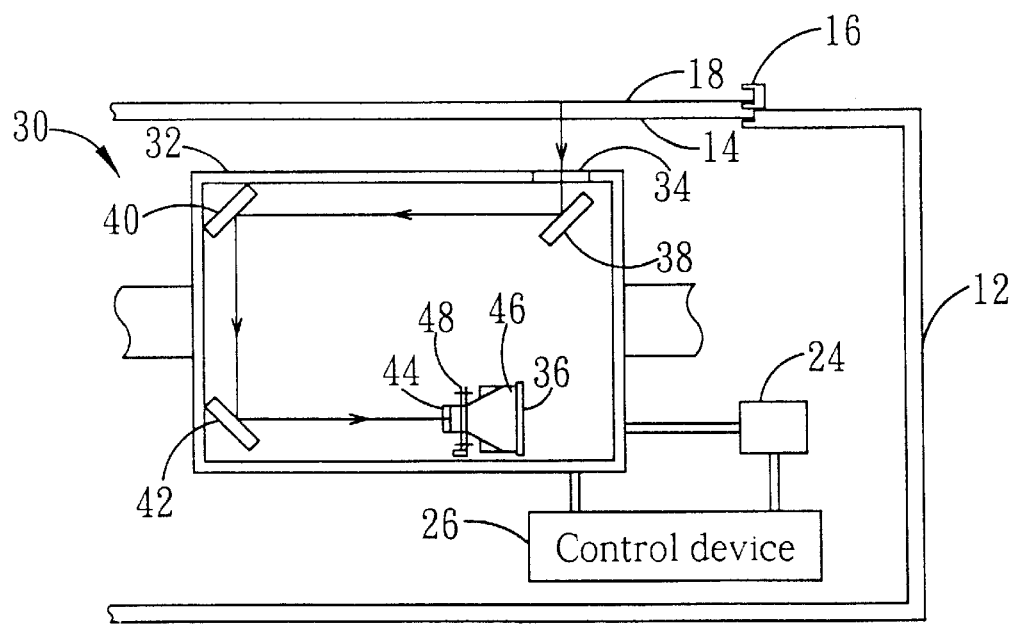
FIG. 2 is a schematic diagram of the inner structure of the scanner shown in FIG. 1.

Please refer to FIG. 2. FIG. 2 is a schematic diagram of the internal structure of the scanner 10 shown in FIG. 1. The scanner 10 comprises an optical scanning module 30 movably installed within the housing 12 of the scanner 10 for scanning documents, a driving device 24 installed in the housing 12 for driving the optical scanning module 30, and a control device 26 installed in the housing 12 for controlling the optical scanning module 30 and the driving device 24. The optical scanning module 30 comprises a casing 32 with a window 34 for receiving light from the scanned document, an optical sensing device 36 installed in the casing 32 for converting light from the scanned document into corresponding image signals, three reflective mirrors 38,40, and 42 installed in the casing 32 for transmitting light from the scanned document to the optical sensing device 36, a lens 44 installed between the reflective mirror 42 and the optical sensing device 36 for converging light from the scanned document onto the optical sensing device 36, a plastic housing 46 movably installed in the casing 32 for fixing the lens 44 and the optical sensing device 36, and an adjusting device 48 connected to the plastic housing 46 for moving the plastic housing 46 and adjusting the object distance from the lens 44 to the scanned document. The lens 44 and the optical sensing device 36 are installed within and move in tandem with the plastic housing 46. This allows the image distance between the lens 44 and the optical sensing device 36 to be kept constant.

To scan the transmitted document 20, the document holder 16 with transparent window 18 as the scanning plane is place onto the transparent platform 14 of the scanner 10. The control device 26 of the scanner 10 uses the object distance adjusting device 48 of the scanner module 30 to move the plastic housing 46 along the optical track forward a distance equal to the height difference between the transparent window 18 and the transparent platform 14. This operation adjusts the object distance between the lens 44 and the transparent window 18 allowing the optical sensing device 36 to effectively scan the transmitted document 20 placed on the transparent window 18.

To scan a reflective document 22, the user removes the document holder 16 and places the reflective document 22 directly onto the transparent platform 14 which is used as the scanning plane. Using the object distance adjusting device 48, the control device 26 moves the plastic housing 46 along the optical track backward a distance equal to the height difference between the transparent window 18 and the transparent platform 14. This operation allows the optical sensing device 36 to effectively scan the reflective document 22.

Figure 3:
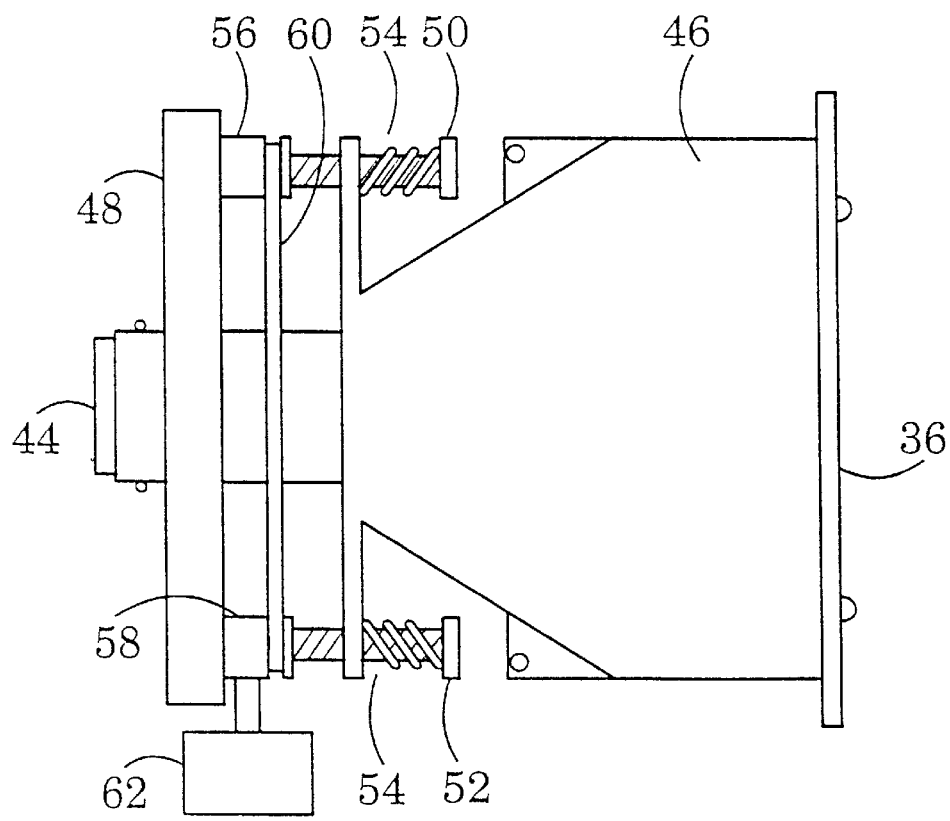
FIG. 3 is a schematic diagram of the lens, optical sensing device, plastic housing, and object distance adjusting device of the scanner shown in FIG. 1.

Please refer to FIG. 3. FIG. 3 is a schematic diagram of the lens 44, optical sensing device 36, plastic housing 46, and object distance adjusting device 48 of the scanner 10. The lens 44 and the optical sensing device 36 are respectively installed at front and back ends of the plastic housing 46 which is mounted on the object distance adjusting device 48 with its right and left ends allowing the object distance adjusting device 48 to move the plastic housing 46 forward and backward along the optical track.

The object distance adjusting device 48 comprises two adjusting screws 50,52 rotatably fixed at two ends of the plastic housing 46, two springs 54 each being installed between each of the adjusting screws 50,52 and the two ends of the plastic housing 46 for fixing the two ends of the plastic housing 46. This prevents vibration of the plastic housing 46 which could adversely affect the object distance from the lens 44 to the optical sensing device 36 or throw the scanner 10 out of focus. The object distance adjusting device 48 further comprises two pulleys 56,58 respectively installed at ends of the screws 50,52, a circular belt 60 mounted on the pulleys 56,58, and a motor 62 connected to the pulley 58 for moving the pulley 58. When the control device 26 causes the motor 62 to move the pulley 58, the pulley 56 also moves through the action of the belt 60. The screws 50,52 then start to rotate under the drive of the pulleys 56,58. This rotation of the screws 50,52 moves the plastic housing 46 forward or backward to adjust the object distance from the scanned document to the lens 44.

Using the above procedure of adjusting the object distance between the scanned document and the lens 44, the control device 26 can also use devices similar to the plastic housing 46 and the object distance adjusting device 48 shown in FIG. 3 to adjust the object distance byhorizontally moving the reflective mirrors 40,42 laterally at the same time.

Since the present invention scanner 10 comprises an adjustable object adjusting device, the object distance is always accurate regardless of whether a transmitted document 22 or a reflective document 20 is scanned. This ensures exact resolution and high scanning quality of the scanner 10.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A flatbed scanner comprising:

a housing with a transparent platform for placing a document to be scanned wherein the document is placed onto the transparent platform or onto a document holder placed on the transparent platform;

a scanning module movably installed in the housing under the transparent platform for scanning the document, the scanning module comprising:
a casing with a transparent window for receiving light for the document;
an optical sensing device installed in the casing for converting the light from the document into image signals;
a lens set installed in the casing for converging the light from the document onto the optical sensing device;
an adjusting device installed in the casing for adjusting the object distance from the lens set to the document while the image distance between the lens set and the optical sensing device are kept constant; and
a plastic housing movably installed in the casing over which the lens set and the optical sensing device are fixed in the plastic housing;

a driving device installed in the housing of the scanner for driving the scanning module to scan the document; and a control device installed in the housing for controlling operations of the scanning module and the driving device;

wherein the control device uses the adjusting device to move the plastic housing to adjust the object distance between the document and the lens set of the scanning module to allow the optical sensing device of the scanning module to effectively scan the document placed at varying heights over the transparent platform.

2. The flatbed scanner of claim 1 wherein the optical sensing device is a charge coupled device (CCD) for converting the light from the document into image signals.

3. The optical sensing device of claim 1 wherein the adjusting device comprises two adjusting screws rotatably installed at two ends of the plastic housing, two springs respectively installed between the two adjusting screws and the two ends of plastic housing for fixing the two ends of the plastic housing to prevent vibrations of the plastic housing, two pulleys fixed on the two adjusting screws separately, a circular belt mounted on the pulleys, and a motor for moving the pulleys according to control signals from the control device to adjust the object distance between the document and the lens of the scanning module.

4. The flatbed scanner of claim 1 wherein the scanning module comprises a plurality of mirrors installed in its casing for transmitting the light from the document to the lens set and the optical sensing device, with at least one of the mirrors installed in the case.

* * * * *